(12) United States Patent
Kondo et al.

(10) Patent No.: US 10,347,910 B2
(45) Date of Patent: Jul. 9, 2019

(54) NANO SILICON MATERIAL, METHOD FOR PRODUCING SAME, AND NEGATIVE ELECTRODE OF SECONDARY BATTERY

(71) Applicant: KABUSHIKI KAISHA TOYOTA JIDOSHOKKI, Kariya-shi, Aichi (JP)

(72) Inventors: Takeshi Kondo, Kariya (JP); Yusuke Sugiyama, Kariya (JP); Nobuhiro Goda, Kariya (JP); Takashi Mohri, Kariya (JP); Hiroki Oshima, Kariya (JP); Masataka Nakanishi, Kariya (JP)

(73) Assignee: KABUSHIKI KAISHA TOYOTA JIDOSHOKKI, Kariya-shi, Aichi (JP)

( * ) Notice: Subject to any disclaimer, the term of this patent is extended or adjusted under 35 U.S.C. 154(b) by 0 days.

(21) Appl. No.: 15/314,369

(22) PCT Filed: May 26, 2015

(86) PCT No.: PCT/JP2015/002642
§ 371 (c)(1),
(2) Date: Nov. 28, 2016

(87) PCT Pub. No.: WO2015/182116
PCT Pub. Date: Dec. 3, 2015

(65) Prior Publication Data
US 2017/0200948 A1 Jul. 13, 2017

(30) Foreign Application Priority Data
May 29, 2014 (JP) .................................. 2014-110818

(51) Int. Cl.
| | | |
|---|---|---|
| *H01M 4/38* | (2006.01) | |
| *H01M 4/48* | (2010.01) | |
| *C01B 33/08* | (2006.01) | |
| *H01M 10/052* | (2010.01) | |
| *C01B 33/021* | (2006.01) | |
| *B82Y 30/00* | (2011.01) | |
| *B82Y 40/00* | (2011.01) | |
| *H01M 4/02* | (2006.01) | |

(52) U.S. Cl.
CPC ........... *H01M 4/386* (2013.01); *C01B 33/021* (2013.01); *C01B 33/08* (2013.01); *H01M 4/483* (2013.01); *H01M 10/052* (2013.01); *B82Y 30/00* (2013.01); *B82Y 40/00* (2013.01); *C01P 2002/60* (2013.01); *C01P 2002/72* (2013.01); *C01P 2002/74* (2013.01); *C01P 2004/03* (2013.01); *C01P 2004/04* (2013.01); *C01P 2006/40* (2013.01); *H01M 2004/021* (2013.01); *H01M 2004/027* (2013.01); *Y02T 10/7011* (2013.01)

(58) Field of Classification Search
None
See application file for complete search history.

(56) References Cited

U.S. PATENT DOCUMENTS

| | | | |
|---|---|---|---|
| 4,392,011 A | 7/1983 | Pankove et al. | |
| 5,525,556 A * | 6/1996 | Dunmead ............... | B82Y 30/00 423/344 |
| 6,207,969 B1 | 3/2001 | Yamazaki | |
| 6,245,140 B1 | 6/2001 | Monden et al. | |
| 9,527,748 B2 | 12/2016 | Sugiyama et al. | |
| 2001/0012503 A1 | 8/2001 | Fukuoka et al. | |
| 2004/0166046 A1 | 8/2004 | Fukuoka et al. | |
| 2008/0050573 A1 | 2/2008 | Nakano et al. | |
| 2008/0166634 A1 | 7/2008 | Kim et al. | |
| 2009/0093356 A1 | 4/2009 | Yamamoto | |
| 2009/0186267 A1 | 7/2009 | Tiegs | |
| 2015/0307362 A1 | 10/2015 | Sugiyama et al. | |
| 2016/0006022 A1 * | 1/2016 | Yukawa ................. | H01M 4/134 429/218.1 |

FOREIGN PATENT DOCUMENTS

| | | |
|---|---|---|
| DE | 112013005568 T5 | 9/2015 |
| EP | 2 819 179 A1 | 12/2014 |
| JP | 10-324505 A | 12/1998 |
| JP | 2005-142440 A | 6/2005 |
| JP | 3865033 B2 | 1/2007 |
| JP | 2009-102219 A | 5/2009 |
| JP | 2011-020884 A | 2/2011 |
| JP | 2011-090806 A | 5/2011 |
| JP | 2012-059509 A | 3/2012 |
| JP | 2014-022319 A | 2/2014 |
| JP | 2014-118333 A | 6/2014 |
| WO | 2006/009073 A1 | 1/2006 |

(Continued)

OTHER PUBLICATIONS

Yamanaka et al. New Deintercalation Reaction of Calcium From Calcium Disilicide Synthesis of Layered Polysilane. Materials Research Bulletin. vol. 31, No. 3, pp. 307-316 (Year: 1996).*
Formation of nano-crystalline Si by thermal annealing of SiOx, SiCx and SiOyCx amorphous alloys: model systems for advanced device processing. Journal of Non-Crystalline Solids, 266-269, 1009-1014 (Year: 2000).*
Communication dated Dec. 21, 2017 from the Korean Intellectual Property Office in related application No. 10-2016-7031286.
Communication dated Dec. 25, 2017 from the Russian Patent and Trademark Office in related application No. 2016151175/07.
Communication dated Jun. 19, 2017, issued from the Korean Intellectual Property Office in corresponding Application No. 10-2016-7031287.

(Continued)

*Primary Examiner* — Tanisha Diggs
(74) *Attorney, Agent, or Firm* — Sughrue Mion, PLLC

(57) ABSTRACT

A nano silicon material having reduced amounts of oxygen (O) and chlorine (Cl) contained therein is provided.
The nano silicon material contains fluorine (F) and nano-sized silicon crystallites. Generation of a layer in which oxygen (O) and chlorine (Cl) are present is suppressed due to the presence of fluorine (F), so that a decrease in the moving speed of lithium ions is suppressed. In addition, due to the presence of fluorine (F), the concentrations of oxygen (O) and chlorine (Cl) are reduced, so that reaction thereof with lithium ions is suppressed.

10 Claims, 10 Drawing Sheets

(56) References Cited

FOREIGN PATENT DOCUMENTS

| WO | 2012/057253 A1 | 5/2012 |
|---|---|---|
| WO | 2013/125831 A1 | 8/2013 |

OTHER PUBLICATIONS

Holzenkámpfer, E. et al., "Electron Spin Resonance and Hopping Conductivity of a-SiO$_x$," Journal of Non-Crystalline Solids, vol. 32, 1979, pp. 327-338, (12 pages total).

Communication dated Jun. 28, 2018, issued by the Korean Intellectual Property Office in corresponding Korean Application No. 10-2016-7031286.

Hirotaka Okamoto, et al., "Synthesis and Modification of Silicon Nanosheets and Other Silicon Nanomaterials", Chemistry of European Journal, vol. 17, 2011, pp. 9864-9887 (24 pages total).

W.D.A.M. de Boer, et al., "Red spectral shift and enhanced quantum efficiency in phonon-free photoluminescence from silicon nanocrystals", Nature Nanotechnology, vol. 5, Dec. 2010, pp. 878-884 (7 pages total).

Communication dated Dec. 21, 2017 from the Korean Intellectual Property Office in counterpart application No. 10-2016-7031286.

Communication dated Dec. 25, 2017 from the Russian Patent and Trademark Office in counterpart application No. 2016151175/07.

Communication dated Jan. 18, 2018 from the European Patent Office in related application No. 15800565.2.

Bacioglu et al., "Deposition of highly photoconductive wide band gap a-SiO$_x$:H thin films at a high temperature without H$_2$-dilution", Solar Energy Materials & Solar Cells, vol. 89, 2005, pp. 49-59.

Fukutani et al., "Extremely Narrow Band Gap,~1.50eV, Amorphous Silicon", Mat. Res. Soc. Symp. Proc., vol. 507, 1998, pp. 211-216.

Futako et al., "Fabrication of high quality silicon related films with band-gap of 1.5 eV by chemical annealing", Journal of Non-Crystalline Solids, vol. 198-200, 1996, pp. 1046-1049.

Futako et al., "The structure of 1.5-2.0 eV band gap amorphous silicon films prepared by chemical annealing", Journal of Non-Crystalline Solids, vol. 266-269, 2000, pp. 630-634.

Hazra et al., "Highly photosensitive helium diluted amorphous silicon 1.5 eV band gap: Role of pressure", Journal of Applied Physics, vol. 78, Jul. 1, 1995, pp. 581-583.

H. D. Fuchs et al., "Porous silicon and siloxene: Vibrational and structural properties," Physical Review B, Sep. 15, 1993, pp. 8172-8189, vol. 48, No. 11.

Shoji Yamanaka et al., "New Deintercalation Reaction of Calcium From Calcium Disilicide Synthesis of Layered Polysilane," Materials Research Bulletin, 1996, pp. 307-316, vol. 31, No. 3.

Written Opinion of the International Searching Authority of PCT/JP2015/002642 dated Aug. 11, 2015.

International Search Report of PCT/JP2015/002642 dated Aug. 11, 2015.

Communication dated Aug. 29, 2018, issued by the Intellectual Property Office of India in Application No. 201647039942.

Janotta et al., "Light-induced modification of a-SiOx;H. I: Metastability", Journal of Applied Physics, American Institute of Physics, US, vol. 95, No. 8, Apr. 15, 2004, doi: 10.1063/1.1667007, pp. 4046-4059 (15 pages total).

Janotta Andreas et al: "Light-induced modification of a-SiO$_x$ II: Laser crystallization", Journal of Applied Physics, American Institute of Physics, US, vol. 95, No. 8, Apr. 15, 2004, pp. 4060-4068, XP012067751, (9 pages total).

Communication dated Apr. 11, 2017, issued from the Europe Patent Office in corresponding European Patent Application No. 15800022.4.

Communication dated Feb. 6, 2019, and received Feb. 13, 2019, from the German Patent Office in application No. 112015002524.3.

\* cited by examiner

40nm

40nm

NANO SILICON MATERIAL, METHOD FOR PRODUCING SAME, AND NEGATIVE ELECTRODE OF SECONDARY BATTERY

CROSS REFERENCE TO RELATED APPLICATIONS

This application is a National Stage of International Application No. PCT/JP2015/002642 filed May 26, 2015, claiming priority based on Japanese Patent Application No. 2014-110818 filed May 29, 2014, the contents of all of which are incorporated herein by reference in their entirety.

TECHNICAL FIELD

The present invention relates to a nano silicon material that is usable as the negative electrode active material of a lithium ion secondary battery or the like, a method for producing the nano silicon material, a negative electrode active material that contains the nano silicon material, and a secondary battery using the negative electrode active material.

BACKGROUND ART

Lithium ion secondary batteries are secondary batteries having a high charge/discharge capacity and capable of achieving high output. Currently, lithium ion secondary batteries are mainly used as power supplies for portable electronic equipment, and are expected to be used as power supplies for electric vehicles assumed to be used widely in the future. Lithium ion secondary batteries have, respectively in a positive electrode and a negative electrode, active materials capable of inserting and eliminating lithium (Li) therein/therefrom. The lithium ion secondary batteries operate when lithium ions move through an electrolytic solution provided between the two electrodes.

In lithium ion secondary batteries, a lithium-containing metallic complex oxide such as a lithium cobalt complex oxide is mainly used as the active material for the positive electrode, and a carbon material having a multilayer structure is mainly used as the active material for the negative electrode. The performance of a lithium ion secondary battery is influenced by materials of the positive electrode, the negative electrode, and the electrolyte that are included in the secondary battery. Research and development are actively conducted for active material substances forming the active materials. For example, usage of silicon or a silicon oxide having a higher capacity than carbon is discussed as a substance for the negative electrode active material.

When silicon is used as the negative electrode active material, a battery with a capacity higher than when a carbon material is used is obtained. However, silicon undergoes a large volume change associated with occlusion and release of Li during charging and discharging. Thus, in a secondary battery in which silicon is used as a negative electrode active material, silicon turns into fine powder associated with a volume change thereof during charging and discharging, so that silicon becomes eliminated or detached from a current collector. Therefore, this secondary battery has a problem of short charge/discharge cycle life of the battery. For that reason, a technique to suppress a volume change associated with occlusion and release of Li during charging and discharging by using a silicon oxide as a negative electrode active material, as compared to silicon, is discussed.

For example, usage of a silicon oxide ($SiO_x$: x is about $0.5 \leq x \leq 1.5$) is discussed as the negative electrode active material. $SiO_x$, when being heated, is known to decompose into Si and $SiO_2$. This is referred to as a disproportionation reaction in which a solid separates into two phases, i.e., Si phase and $SiO_2$ phase, through an internal reaction. The Si phase obtained from the separation is extremely fine. In addition, the $SiO_2$ phase that covers the Si phase has a function of suppressing decomposition of the electrolytic solution. Thus, the secondary battery using the negative electrode active material formed of $SiO_x$ that has been decomposed into Si and $SiO_2$ has excellent cycle characteristics.

The cycle characteristics of the secondary battery improve further when finer silicon particles forming the Si phase of the $SiO_x$ described above are used as a negative electrode active material in the secondary battery. JP3865033 (B2) (Patent Literature 1) discloses a method of heating metal silicon and $SiO_2$ to sublimate those into a silicon oxide gas, and cooling the gas to produce $SiO_x$.

JP2009102219 (A) (Patent Literature 2) discloses a production method including decomposing a silicon raw material into an elemental state in a high temperature plasma, rapidly cooling it to the temperature of liquid nitrogen to obtain silicon nano particles, and fixing the silicon nano particles into a $SiO_2$—$TiO_2$ matrix by using a sol-gel method or the like.

In the production method disclosed in Patent Literature 1, the materials are limited to sublimable materials. Moreover, irreversible Li is known to be generated at the negative electrode due to change of the $SiO_2$ phase, which covers the Si phase, into lithium silicate at the time of Li occlusion, and thus it is necessary to add an extra active material to the positive electrode. In addition, in the production method disclosed in Patent Literature 2, high energy is required for plasma discharge. Furthermore, in silicon based materials obtained from these production methods, the silicon particles of the Si phase are speculated to have low dispersibility and be easily aggregated. When the silicon particles aggregate with each other and the particle sizes thereof become large, the secondary battery using those as the negative electrode active material results in having a low initial capacity and deteriorated cycle characteristics.

In recent years, nano silicon materials that are expected for usage in semiconductors, electrics or electronics fields, and the like have been developed. For example, Physical Review B (1993), vol. 48, pp. 8172-8189 (Non-Patent Literature 1) discloses a method for synthesizing a layered polysilane by causing a reaction between hydrogen chloride (HCl) and calcium disilicide ($CaSi_2$), and states that the layered polysilane obtained in this manner can be used in a light-emitting element or the like.

Materials Research Bulletin, Vol. 31, No. 3, pp. 307-316, 1996 (Non-Patent Literature 2) states that plate-like silicon crystal was obtained by performing a heat treatment at 900° C. on a layered polysilane obtained by causing a reaction between hydrogen chloride (HCl) and calcium disilicide ($CaSi_2$).

JP2011090806 (A) (Patent Literature 3) discloses a lithium ion secondary battery in which a layered polysilane is used as a negative electrode active material.

CITATION LIST

Patent Literature

Patent Literature 1: JP3865033 (B2)
Patent Literature 2: JP2009102219 (A)
Patent Literature 3: JP2011090806 (A)

Non-Patent Literature

Non-Patent Literature 1: Physical Review B (1993), vol. 48, pp. 8172-8189
Non-Patent Literature 2: Materials Research Bulletin, vol. 31, No. 3, pp. 307-316, 1996

SUMMARY OF INVENTION

Technical Problem

The inventors of the present application thoroughly researched the structure of a silicon material obtained by performing a heat treatment on a layered silicon compound obtained by a reaction between hydrogen chloride (HCl) and calcium disilicide ($CaSi_2$), such as the plate-like silicon crystal disclosed in Non-Patent Literature 2. Through the research, a structure in which a plurality of nano silicon layers each having a thickness of about 10 nm are laminated was confirmed, and a layer containing chlorine (Cl) and oxygen (O) was confirmed to be interposed between the nano silicon layers. When such a silicon material is used as the negative electrode active material of a lithium ion secondary battery, lithium ions reach internal silicon via the layer containing chlorine (Cl) and oxygen (O). Chlorine (Cl) and oxygen (O) react with lithium ions and an electrolytic solution. Thus, the lithium moving speed is assumed to decrease due to a decomposition product generated as a by-product. In particular, when lithium chloride or the like is generated, the conductive resistance is thought to become higher so that the initial efficiency of the battery decreases.

In addition, the inventors of the present application produced silicon materials by changing the heat treatment temperature for the above layered silicon compound and investigated the characteristics of lithium ion secondary batteries in which these silicon materials are used as negative electrode active materials. As a result, the inventors of the present application found that the secondary battery with the silicon material for which the heat treatment temperature is lower has a higher capacity, and the secondary battery with the silicon material for which the heat treatment temperature is higher has higher initial efficiency.

A silicon material produced at, for example, a heat treatment temperature of about 500° C. has a high BET specific surface area. Thus, with this silicon material, an electrochemical reaction between silicon and lithium ions to form an alloy efficiently proceeds. Therefore, a secondary battery in which this silicon material is used as a negative electrode active material has a high capacity, but also has an increased amount of lithium and an electrolytic solution decomposed on the active material surface. In addition, in this silicon material, no silicon crystallite is formed, and thus electrical conductivity is not sufficient, so that the initial efficiency regarding occlusion and release of lithium of the electrode is low. Meanwhile, in a secondary battery in which a silicon material produced at a heat treatment temperature of about 800° C. is used as a negative electrode active material, the electrical conductivity improves since nano-sized silicon crystallites are generated in the silicon material. In addition, the amount of lithium and an electrolytic solution decomposed on the active material surface also becomes small since the BET specific surface area becomes small, so that the initial efficiency improves. However, the efficiency of a reaction between silicon and lithium ions to form an alloy decreases since the BET specific surface area becomes small, so that the capacity of the secondary battery is low.

Conventional silicon materials are shown to have various flaws as in the contradictory events described above. The present invention has been made in view of such a situation, and its problem to be solved is to provide a new nano silicon material that is usable as the negative electrode active material of a secondary battery, or the like, and contains nano-sized silicon crystallites.

Solution to Problem

A nano silicon material of the present invention solving the above-described problem contains fluorine and nano-sized silicon crystallites.

A production method for the nano silicon material of the present invention includes performing a heat treatment in a non-oxidizing atmosphere at a temperature of not lower than 350° C. on a layered silicon compound obtained by causing a reaction between $CaSi_2$ and a chemical solution containing 0.01 mass % or greater of an acid containing fluorine at least in an anion thereof.

A secondary battery of the present invention includes a negative electrode containing a negative electrode active material of the present invention.

Advantageous Effects of Invention

The nano silicon material of the present invention is useful as the negative electrode active material of a secondary battery using a nonaqueous electrolytic solution.

The nano silicon material of the present invention contains nano-sized silicon crystallites. Therefore, when the nano silicon material of the present invention is used as the negative electrode active material of a lithium ion secondary battery or the like, the initial efficiency of the secondary battery improves.

Moreover, when the layered silicon compound obtained by causing a reaction between $CaSi_2$ and the chemical solution containing 0.01 mass % or greater of the acid containing fluorine in the anion thereof is used as a starting material, the nano silicon material of the present invention contains fluorine (F), has a small oxygen (O) amount, and also has a small chlorine (Cl) amount or contains no chlorine (Cl), as compared to the conventional art. Therefore, when the nano silicon material of the present invention is used as the negative electrode active material of a lithium ion secondary battery or the like, a decomposition product generated as a by-product due to reaction with lithium and a an electrolytic solution reduces, a decrease in the moving speed of lithium is suppressed, and the initial efficiency of the secondary battery improves.

Furthermore, with the production method for the nano silicon material of the present invention, even when a heat treatment is performed at a low temperature lower than 800° C., a large amount of nano-sized silicon crystallites are formed, and an active material having a high BET specific surface area value and containing nano silicon is provided.

DESCRIPTION OF EMBODIMENTS

<Production Method for Nano Silicon Material>

Figure 1:
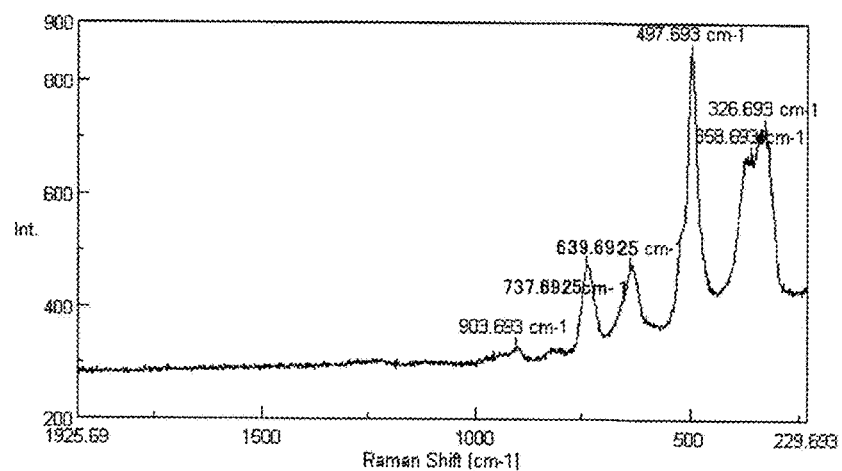
FIG. 1 is a Raman spectrum of a layered silicon compound obtained in Example 1.

The nano silicon material of the present invention contains fluorine and nano-sized silicon crystallites. The nano silicon material is easily and stably produced by using the production method of the present invention. In the following, the production method of the present invention is described.

In the production method of the present invention, a step of performing a heat treatment in a non-oxidizing atmosphere at a temperature of not lower than 350° C. on a layered silicon compound that is obtained by causing a reaction between $CaSi_2$ and a chemical solution containing 0.01 mass % or greater of an acid containing fluorine at least in the anion thereof, is performed. Hereafter, a step of producing the layered silicon compound is sometimes referred to as a layered silicon compound producing step.

Examples of the acid containing fluorine at least in the anion thereof include hydrofluoric acid, tetrafluoroboric acid, hexafluorophosphoric acid, hexafluoroarsenic acid, fluoroantimonic acid, hexafluorosilicic acid, hexafluorogermanic acid, hexafluorostannic (IV) acid, trifluoroacetic acid, hexafluorotitanic acid, hexafluorozirconic acid, trifluoromethanesulfonic acid, and fluorosulfonic acid, etc.

Another acid may be contained when at least one acid selected from the above acids is contained in an amount of not less than 0.01 mass %. Examples of the other acid include hydrochloric acid, hydrobromic acid, hydroiodic acid, sulfuric acid, methanesulfonic acid, nitric acid, phosphoric acid, formic acid, and acetic acid, etc.

The reaction between $CaSi_2$ and the chemical solution containing 0.01 mass % or greater of the acid containing fluorine at least in the anion thereof may be carried out under conditions that are the same as those described in Non-Patent Literature 1 and 2. In the layered silicon compound producing step, the reaction is preferably carried out at a low temperature equal to or lower than room temperature, and is desirably carried out on an ice bath. The obtained layered silicon compound has a smaller oxygen amount than a layered silicon compound obtained by the method disclosed in Non-Patent Literature 1 or 2, and contains fluorine.

In the layered silicon compound producing step, when hydrofluoric acid (HF) is used as the acid containing fluorine at least in the anion thereof, hydrochloric acid (HCl) is preferably mixed therewith and used. Even when only hydrofluoric acid (HF) is used, a layered silicon compound is obtained. However, the obtained layered silicon compound has high activity, and becomes oxidized by a very small amount of air to increase the oxygen amount. Thus, using only hydrofluoric acid (HF) is not preferable. In addition, the case of using only hydrochloric acid (HCl) is the same as in Non-Patent Literature 1 and 2, and only a layered silicon compound having a large oxygen amount is obtained in such a case.

The mixing ratio between hydrofluoric acid (HF) and hydrochloric acid (HCl) is desirably within the range of HF/HCl=1/1 to 1/100 in mole ratio. Having an amount of hydrofluoric acid (HF) larger than that described in this ratio is not preferable, since a large amount of impurities such as $CaF_2$ and CaSiO-type may be generated and it is difficult to separate the layered silicon compound from these impurities. Furthermore, when the amount of hydrogen fluoride (HF) is smaller than that described in this ratio, the etching action by hydrofluoric acid (HF) with respect to Si—O bond becomes weak, and a large amount of oxygen remains in the obtained layered silicon compound in some cases.

The blend ratio between calcium disilicide ($CaSi_2$) and the mixture of hydrofluoric acid (HF) and hydrochloric acid (HCl) is desirably excessive for the acid than equivalency. In addition, the reaction atmosphere is desirably a vacuum or inert gas atmosphere. Using this layered silicon compound producing step has been shown to shorten the reaction time compared to that with the production method in Non-Patent Literature 1 or 2. An excessively long reaction time causes additional reaction between Si and HF to generate $SiF_4$. Thus, a reaction time of about 0.25 to 24 hours is sufficient. Although $CaCl_2$ or the like is generated from the reaction, $CaCl_2$ or the like is easily removed through rinsing with water, so that refinement of the layered silicon compound is easy.

In the layered silicon compound producing step, when, for example, tetrafluoroboric acid ($HBF_4$) is used as the acid containing fluorine at least in the anion thereof, it is not necessary to mix hydrochloric acid (HCl) therewith, and reaction between calcium disilicide ($CaSi_2$) and only tetrafluoroboric acid ($HBF_4$) is allowed to be carried out. The reaction conditions may be the same as described above. With this method, the obtained layered silicon compound and nano silicon material do not contain chlorine (Cl). Thus, when the nano silicon material of the present invention is used as a negative electrode active material, the conductive resistance is further reduced.

In a Raman spectrum of the layered silicon compound obtained in the above-described layered silicon compound producing step, peaks are present at 330±20 cm$^{-1}$, 360±20 cm$^{-1}$, 498±20 cm$^{-1}$, 638±20 cm$^{-1}$, and 734±20 cm$^{-1}$ of Raman shift. The layered silicon compound is mainly composed of a structure in which a plurality of six-membered rings formed from silicon atoms are connected.

In the production method of the present invention, subsequent to the above-described layered silicon compound producing step, a heat treatment is performed on the obtained layered silicon compound. The heat treatment is performed in a non-oxidizing atmosphere. Examples of the non-oxidizing atmosphere include a reduced pressure atmosphere, a vacuum atmosphere, and an inert gas atmosphere. In addition, when the heat treatment temperature is excessively high, the BET specific surface area of an obtained nano silicon material is excessively low in some cases, and when the heat treatment temperature is excessively low, generation of a nano silicon material is difficult in some cases. Thus, the heat treatment temperature is preferably within the range of equal to or higher than 350° C. and lower than 950° C., and particularly preferably within the range of not lower than 400° C. and not higher than 800° C.

By performing the heat treatment on the layered silicon compound in the non-oxidizing atmosphere, a nano silicon material containing fluorine and nano-sized silicon crystallites is obtained. The time of the heat treatment depends on the heat treatment temperature, and is sufficiently one hour when the heat treatment temperature is not lower than 500° C.

<Nano Silicon Material>

Having a peak at a lower wave number side than 520 cm$^{-1}$ of Raman shift and the half width of this peak being within the range of 30 to 100 cm$^{-1}$ may be an index for identifying the nano silicon material of the present invention. The above peak is derived from a mixed state of silicon crystallites and amorphous silicon.

The silicon crystallites contained in the nano silicon material of the present invention have a crystallite size of preferably 0.5 nm to 300 nm, further preferably 1 nm to 30 nm, and particularly preferably 1 nm to 10 nm. If the crystallite size is greater than 300 nm, when the nano silicon material of the present invention is used as the negative electrode active material of a secondary battery, the battery capacity decreases in some cases. The crystallite size is calculated in accordance with Scherrer's equation from the half width of a diffraction peak (present at a position at which 2θ is 27° to 30°) of the (111) plane in an X-ray diffraction measurement result.

The nano silicon material of the present invention contains fluorine (F). The amount of fluorine contained in the nano silicon material may be within the range of 0.01 to 10 mass %. When the fluorine amount is smaller than this range, the amount of chlorine (Cl) or oxygen (O) becomes large, and thus the conductive resistance becomes high, so that the initial efficiency of a secondary battery in which such a nano silicon material is used as a negative electrode active material decreases. Furthermore, when the fluorine amount in the nano silicon material is larger than this range, the capacity of a secondary battery in which this nano silicon material is used as a negative electrode active material decreases in some cases. The amount of fluorine contained in the nano silicon material is particularly preferably within the range of 1 to 5 mass %.

Fluorine (F) is present in a substantially uniformly dispersed state within the nano silicon material of the present invention and is not unevenly present therein in some cases. In addition, oxygen (O) may be contained in the nano silicon material of the present invention, and, in such a case, chlorine (Cl) is also contained if hydrochloric acid (HCl) is used in combination when a layered silicon compound is synthesized. As described later, in the nano silicon material of the present invention, chlorine (Cl) or oxygen (O) is inhibited from being unevenly present as layers as compared to a nano silicon material that does not contain fluorine, and the regularity of a distribution of Si is also low.

The nano silicon material of the present invention may be complex particles further containing at least one of amorphous silicon, a silicon oxide ($SiO_x$, 0<x<2), or a silicon compound, in addition to silicon crystallites. In the complex particles, the silicon crystallites are present on the surface of and/or within the at least one of the amorphous silicon, the silicon oxide ($SiO_x$, 0<x<2), or the silicon compound. For example, the silicon crystallites may be dispersed in an island state within a matrix mainly formed from amorphous silicon, or may adhere to the surfaces of particles mainly formed from amorphous silicon, in an island state.

The particle diameter of the nano silicon material (complex particles) of the present invention is not particularly limited. When the nano silicon material (complex particles) of the present invention is used as the negative electrode active material of a secondary battery, a nano silicon material classified into the range of 2 μm to 20 μm is preferably used.

The nano silicon material of the present invention may have a structure composed of a plurality of plate-like bodies laminated in the thickness direction thereof. Each of the plate-like bodies often has a thickness within the range of 1 nm to 200 nm. Preferably, the nano silicon material of the present invention has connection portions at which the plate-like bodies are chemically or physically connected to each other, and has hollow portions surrounded by the plate-like bodies and the connection portions. A reason for this is that the hollow portions are thought to serve as cushioning parts during expansion associated with a reaction between silicon and lithium to form an alloy, thereby providing an effect of maintaining an electrode structure. Another reason for this is that the area of contact with an electrolytic solution increases, so that the battery capacity increases.

In consideration of the battery characteristics obtained when the nano silicon material of the present invention is used as the negative electrode active material of a secondary battery, the nano silicon material of the present invention has a BET specific surface area of preferably 3 to 100 m$^2$/g, further preferably 4 to 80 m$^2$/g, and particularly preferably 7 to 60 m$^2$/g.

The nano silicon material of the present invention desirably has an oxygen (O) amount of not greater than 20 mass %. Whereas the oxygen amount in nano silicon obtained by performing a heat treatment on the layered silicon compound disclosed, for example, in Non-Patent Literature 1 or 2 is about 33 mass % and is large, the oxygen amount of the nano silicon material obtained by performing the heat treatment on the layered silicon compound produced by the production method of the present invention is not greater than 30 mass % and is small.

The elemental composition of the nano silicon material of the present invention preferably has a relationship of $SiO_x$-$Cl_yF_z$ ($0<(x+y+z)\leq1$, $x<0.5$), and particularly desirably satisfies $0<(x+y+z)\leq0.3$. That is, when the number of atoms of silicon (Si) is regarded as 1, the number of atoms (x) of oxygen (O) is preferably less than 0.5 and the total number of atoms (x+y+z) of oxygen (O), chlorine (Cl), and fluorine (F) is preferably not greater than 1; and the total number of atoms (x+y+z) is particularly desirably not greater than 0.3. It is needless to say that z>0 is satisfied, since fluorine (F) is always contained.

When the number of atoms of silicon (Si) is regarded as 1, the number of atoms (x) of oxygen (O) in the nano silicon material of the present invention is preferably within the range of not greater than 0.5, further preferably within the range of not greater than 0.3, and particularly preferably within the range of not greater than 0.2. When the number of atoms of silicon (Si) is regarded as 1, the number of atoms (y) of chlorine (Cl) is preferably within the range of not greater than 0.1, further preferably within the range of not greater than 0.05, and particularly preferably within the range of not greater than 0.01. Furthermore, when the number of atoms of silicon (Si) is regarded as 1, the number of atoms (z) of fluorine (F) is preferably within the range of 0.001 to 0.2, further preferably within the range of 0.01 to 0.2, and particularly preferably within the range of 0.1 to 0.2.

<Negative Electrode of Secondary Battery>

The nano silicon material of the present invention can be used as a negative electrode active material in a secondary battery such as a lithium ion secondary battery. The negative electrode of, for example, a nonaqueous secondary battery is produced, using the nano silicon material of the present invention, by: applying, on the current collector using a method such as roll coating method, dip coating method, doctor blade method, spray coating method, or curtain coating method, a slurry obtained through adding and mixing a negative electrode active material powder containing the nano silicon material of the present invention, the conductive additive such as a carbon powder, a binder, and a proper amount of an organic solvent; and drying or curing the binder.

As the negative electrode active material powder contained in the slurry, a powder having a particle diameter classified into the range of 2 μm to 20 μm is preferably used. When a powder having a particle diameter of less than 2 μm is contained, the contact interface with an electrolytic solution increases, so that a degradation product of the electrolytic solution increases during use as a secondary battery in some cases. Particles having a particle diameter of greater than 20 μm have increased stress at the outermost shell thereof, and a negative electrode active material layer becomes broken or comes off in some cases. Furthermore, the thickness of the negative electrode active material layer depends on the particle diameter of the negative electrode active material, and control of the thickness is difficult in some cases. As the method of the classification, a method known in the art may be used.

Although the binder is demanded to bind the active material or the like with the smallest possible amount, the added amount of the binder is desirably 0.5 mass % to 50 mass % of the total amount of the active material, the conductive additive, and the binder. Moldability of an electrode deteriorates when the amount of the binder is less than 0.5 mass %, whereas the energy density of an electrode decreases when the amount of the binder is greater than 50 mass %.

As the binder, both a solvent-based binder and a water-based binder may be used. Examples of the solvent-based binder include polyvinylidene difluoride (PVdF), polytetrafluoroethylene (PTFE), styrene-butadiene rubber (SBR), polyimide (PI), polyamide-imide (PAI), polyamide (PA), polyvinyl chloride (PVC), polymethacrylic acid (PMA), polyacrylonitrile (PAN), modified polyphenylene oxide (PPO), polyethylene oxide (PEO), polyethylene (PE), and polypropylene (PP), etc.

The water-based binder refers to a binder that is mixed and used with an active material in a state where the binder is dispersed or dissolved in water, and, as typical examples of the water-based binder, polyacrylic acid (PAA), lithium polyacrylate, sodium polyacrylate, potassium polyacrylate, styrene-butadiene rubber (SBR), sodium alginate, and ammonium alginate may be used. One obtained by mixing carboxymethylcellulose (CMC) into each of these binders may be used as the water-based binder, or instead of SBR and/or PAA, CMC may be used singly as the water-based binder. In addition, as the water-based binder, a crosslinked product of a water-soluble polymer may be used, and a water-soluble cellulose ester crosslinked product such as a CMC crosslinked product, and a starch/acrylic acid graft polymer, etc. may be used.

When polyvinylidene difluoride is used as the binder, the potential of the negative electrode is reduced and the voltage of the electrical storage device improves. Furthermore, using polyamide-imide (PAI) or polyacrylic acid (PAA) as the binder improves initial efficiency and discharge capacity in some cases.

The current collector refers to a fine electron conductor that is chemically inert for continuously sending a flow of current to the electrode during discharge or charging. The current collector may be used in the form of a foil, a plate, or the like. However, the form is not particularly limited as long as the form is in accordance with the purpose. As the current collector, for example, a copper foil or an aluminum foil may be suitably used.

Regarding the negative electrode active material, a material known in the art such as graphite, hard carbon, silicon, carbon fibers, tin (Sn), and silicon oxides may be mixed into the nano silicon material of the present invention.

The conductive additive is added for increasing the electrical conductivity of the electrode. As the conductive additive to be added, carbonaceous fine particles such as carbon black, natural graphite, granulated graphite, artificial graphite, fire-resistant graphite, acetylene black (AB), Ketchen black (KB) (registered trademark), scaly graphite, and vapor grown carbon fiber (VGCF) may be used singly, or two or more types of them may be used in combination. The usage amount of the conductive additive is not particularly limited, but may be, for example, about 5 to 100 parts by mass with respect to 100 parts by mass of the active material. When the amount of the conductive additive is less than 5 parts by mass, an efficient electrically-conductive path is not formed, and when the amount of the conductive additive is greater than 100 parts by mass, moldability of the electrode worsens and the energy density of the electrode becomes low. When a silicon oxide composited with a carbon material is used as the active material, the added amount of the conductive additive may be reduced or may be zero.

The organic solvent is not particularly limited, and a mixture of a plurality of solvents may be used. The organic solvent is particularly preferably, for example, N-methyl-2-pyrrolidone, a mixed solvent of N-methyl-2-pyrrolidone and an ester based solvent (ethyl acetate, n-butyl acetate, butyl cellosolve acetate, butyl carbitol acetate, etc.) or a mixed solvent of N-methyl-2-pyrrolidone and a glyme based solvent (diglyme, triglyme, tetraglyme, etc.).

When the secondary battery of the present invention is a lithium ion secondary battery, the negative electrode may be predoped with lithium. For the doping of the negative electrode with lithium, for example, an electrode forming method of assembling a half cell using metal lithium as a counter electrode, and electrochemically doping with lithium may be used. The degree of doping with lithium is not particularly limited.

When the secondary battery of the present invention is a lithium ion secondary battery, a not-particularly limited positive electrode, electrolytic solution, or separator known in the art may be used. Any positive electrode may be used as long as the positive electrode is one that is usable in a lithium ion secondary battery. The positive electrode includes a current collector, and a positive electrode active material layer bound on the current collector. The positive electrode active material layer contains a positive electrode active material and a binder, and may further contain a conductive additive. The positive electrode active material, the conductive additive, and the binder are not particularly limited, and those usable in a lithium ion secondary battery may be used.

Examples of the positive electrode active material include metal lithium, a Li compound or a solid solution selected from $LiCoO_2$, $Li_xNi_aCo_bMn_cO_2$, $Li_xCo_bMn_xO_2$, $Li_xNi_aM-n_xO_2$, $Li_xNi_aCo_bO_2$, and $Li_2MnO_3$ (note that $0.5 \leq x \leq 1.5$, $0.1 \leq a < 1$, $0.1 \leq b < 1$, and $0.1 \leq c < 1$), $Li_2MnO_3$, and sulfur, etc. As the current collector, one that is generally used for the positive electrode of a lithium ion secondary battery, such as aluminum, nickel, and stainless steel, may be used. As the conductive additive, one that is similar to that described above in relation to the negative electrode may be used.

The electrolytic solution is obtained by dissolving a lithium metal salt, which is an electrolyte, in the organic solvent. As the organic solvent, one or more members selected from aprotic organic solvents such as, for example, propylene carbonate (PC), ethylene carbonate (EC), dimethyl carbonate (DMC), diethyl carbonate (DEC), ethyl methyl carbonate (EMC), and fluoroethyl carbonate (FEC) may be used. As the electrolyte to be dissolved, a lithium metal salt that is soluble to the organic solvent, such as $LiPF_6$, $LiBF_4$, $LiAsF_6$, $LiI$, $LiClO_4$, and $LiCF_3SO_3$, may be used.

As the electrolytic solution, for example, a solution obtained by dissolving a lithium metal salt such as $LiClO_4$, $LiPF_6$, $LiBF_4$, or $LiCF_3SO_3$ in an organic solvent such as ethylene carbonate, dimethyl carbonate, propylene carbonate, or dimethyl carbonate at a concentration of about 0.5 mol/L to 1.7 mol/L may be used.

The separator is not particularly limited as long as the separator is one usable in a lithium ion secondary battery. The separator serves to separate the positive electrode and the negative electrode to retain the electrolytic solution, and a thin macroporous film of polyethylene, polypropylene, or the like may be used as the separator.

The form of the secondary battery of the present invention is not particularly limited, and various forms such as a cylinder type, a laminated type, and a coin type, etc., may be used. Even when any of the forms is used, a battery is formed by: making an electrode assembly by interposing the separator between the positive electrode and the negative electrode; respectively connecting a positive electrode current collector to a positive electrode external terminal and a negative electrode current collector to a negative electrode external terminal using current collecting leads or the like; and then sealing the electrode assembly together with the electrolytic solution in a battery case.

EXAMPLES

In the following, embodiments of the present invention will be described specifically by means of Examples and Comparative Examples.

Example 1

Twenty milliliters of a tetrafluoroboric acid aqueous solution having a concentration of 40 mass was set to a temperature of 0° C. in an ice bath, and 2.0 g of calcium disilicide ($CaSi_2$) was added thereto and the mixed solution was stirred in an argon gas current. After completion of foaming was confirmed, the mixed solution was warmed to room temperature and further stirred for 2 hours at room temperature, then 20 ml of distilled water was added thereto, and the mixed solution was further stirred for 10 minutes. At this moment, suspension of a yellow powder was observed.

The obtained mixed solution was filtered, and the residue was rinsed with 10 ml of distilled water, then rinsed with 10 ml of ethanol, and vacuum dried to obtain 2 g of a layered silicon compound. A Raman spectrum of the layered silicon compound is shown in FIG. 1. Peaks are present at $330 \pm 10$ $cm^{-1}$, $360 \pm 10$ $cm^{-1}$, $498 \pm 10$ $cm^{-1}$, $638 \pm 10$ $cm^1$, and $734 \pm 10$ $cm^{-1}$ of Raman shift.

Then, 2 g of the layered silicon compound was weighed out, and a heat treatment of keeping the layered silicon compound at 500° C. was performed for 1 hour in argon gas in which the amount of $O_2$ was not greater than 1 vol %, to obtain 1.45 g of a brown nano silicon material.

During the heat treatment, Si—H bond is cut and hydrogen (H) is detached, and cutting and rebinding of Si—Si bond occur. Rebinding of Si—Si bond occurs within the same layer and also between adjacent layers. As a result, silicon primary particles (silicon crystallites) having a diameter in nano-order are generated. The silicon primary particles aggregate with each other to generate a nano silicon material (secondary particles).

Figure 2:
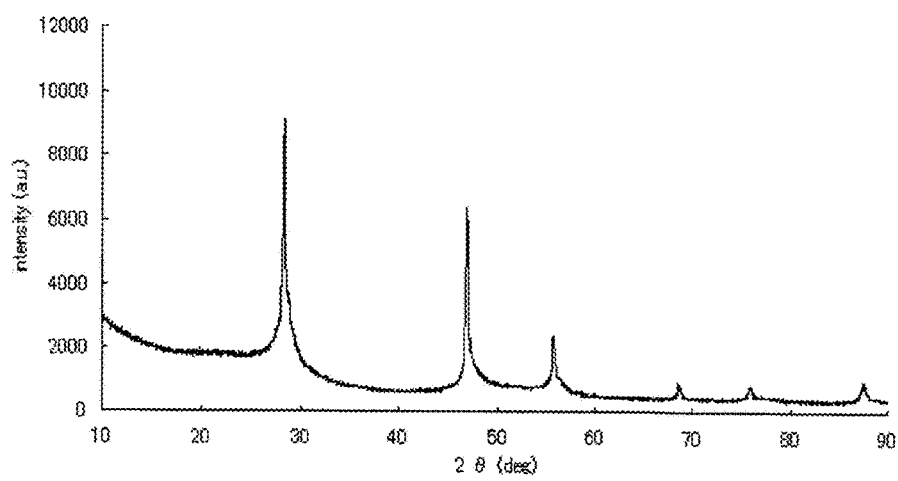
FIG. 2 is an XRD chart of a nano silicon material according to Example 1.

Measurement of X-ray diffraction (XRD measurement) using CuKα radiation was conducted on the obtained nano silicon material. An XRD chart is shown in FIG. 2. From FIG. 2, presence of three peaks derived from the silicon crystallites is confirmed. The crystallite size of the silicon crystallites calculated in accordance with Scherrer's equation from the half width of a diffraction peak (present at a position at which 2θ is 27° to 30°) of the (111) plane in the X-ray diffraction measurement result was 7.8 nm. The BET specific surface area of the nano silicon material was 13.2 $m^2/g$.

Figure 3:
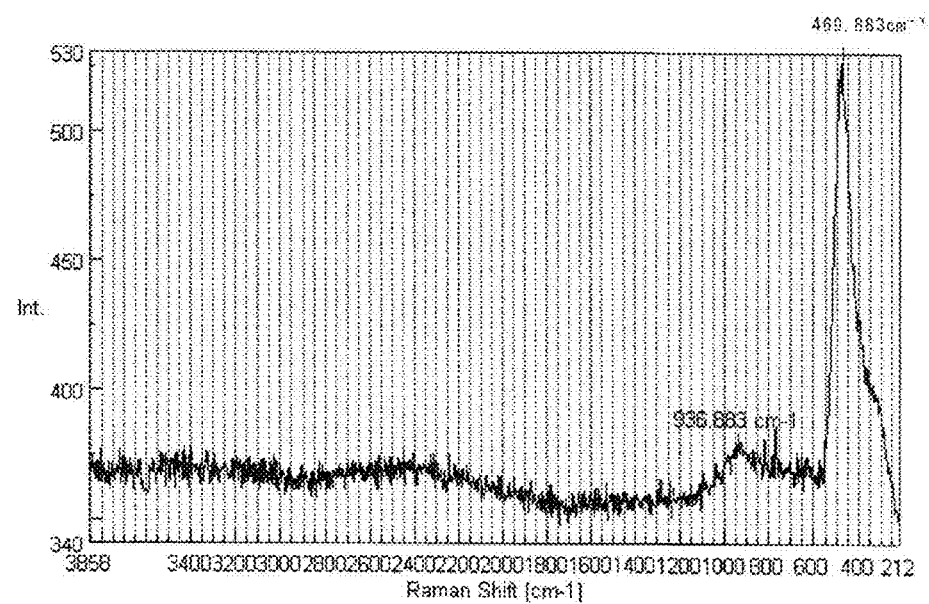
FIG. 3 is a Raman spectrum of the nano silicon material according to Example 1.

A Raman spectrum of the obtained nano silicon material is shown in FIG. 3. The nano silicon material has a peak at a lower wave number side (approximately 470 $cm^{-1}$) than 520 $cm^{-1}$ of Raman shift, and the half width of this peak is 98 $cm^{-1}$.

Figure 4:
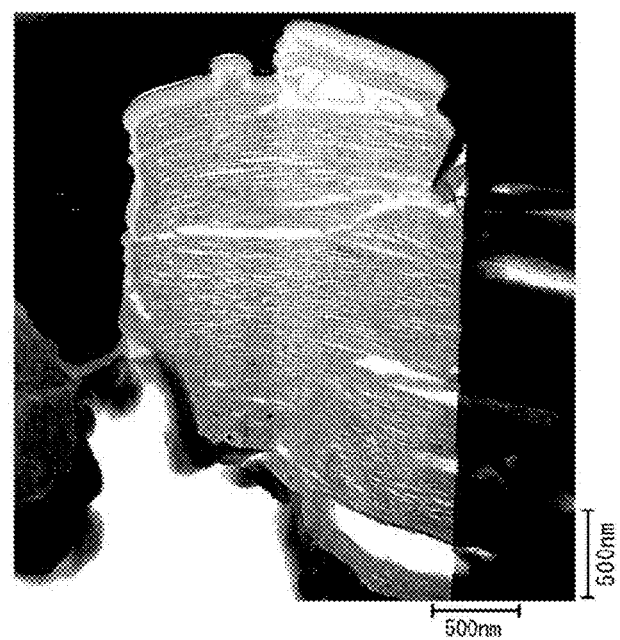
FIG. 4 shows an SEM image of the nano silicon material according to Example 1.
Figure 5:
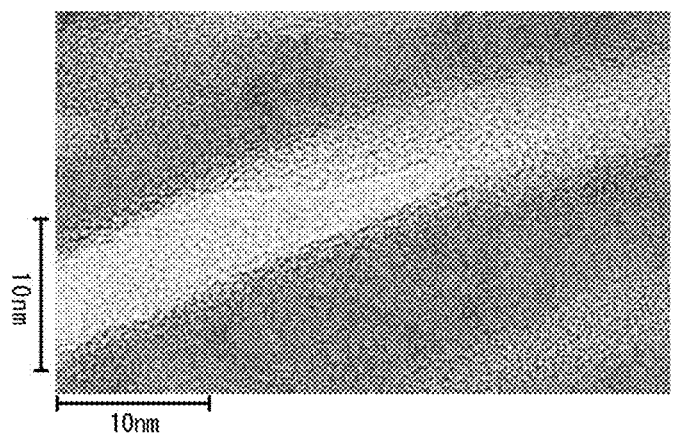
FIG. 5 shows a TEM image of the nano silicon material according to Example 1.

An SEM image and a TEM image of the obtained nano silicon material are shown in FIGS. 4 and 5, respectively. In FIG. 4, a structure in which plate-like bodies are laminated is observed. From FIG. 5, a stripe-like pattern suggesting presence of crystallites is observed in a TEM image of the plate-like bodies in a gray part. The thicknesses of the plate-like bodies in the gray part are 5 nm to 30 nm, and the long sides thereof are 0.1 μm to 50 μm. In addition, when electron diffraction by TEM with respect to the obtained nano silicon material was observed, diffraction indicating crystal was confirmed.

Figure 6:
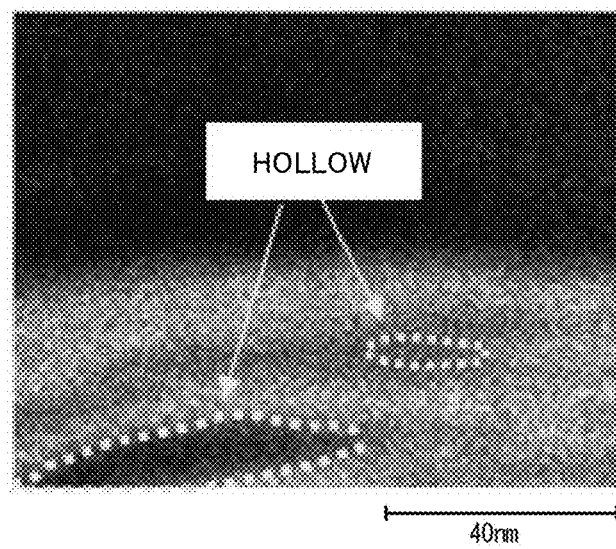
FIG. 6 is a TEM-EDX image showing a distribution of silicon (Si) of the nano silicon material according to Example 1.
Figure 7:
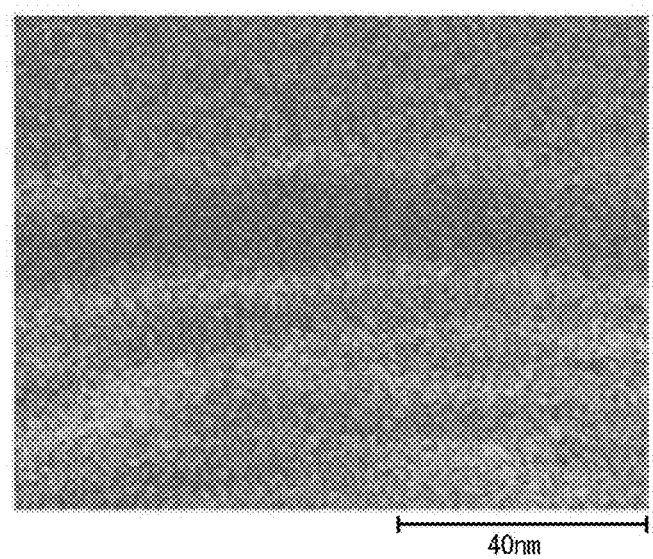
FIG. 7 is a TEM-EDX image showing a distribution of oxygen (O) of the nano silicon material according to Example 1.
Figure 8:
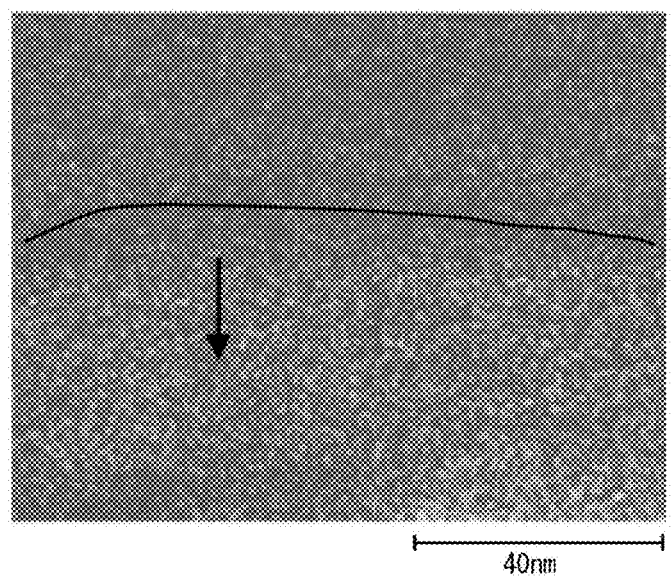
FIG. 8 is a TEM-EDX image showing a distribution of fluorine (F) of the nano silicon material according to Example 1.

The nano silicon material was further analyzed by TEM-EDX (energy dispersive X-ray spectroscopy). A distribution of silicon (Si) is shown in FIG. 6, a distribution of oxygen (O) is shown in FIG. 7, and a distribution of fluorine (F) is shown in FIG. 8. A substantially upper half in each drawing is a support material (epoxy resin). Each of oxygen (O) and fluorine (F) is observed to be present also in the upper half, since a part thereof adheres to the support material.

Comparison is made to a distribution of each element in a nano silicon material according to Comparative Example 2 described later. Through comparison between FIG. 6 and FIG. 15, presence of hollow portions in which silicon (Si) is not present are observed in the nano silicon material of the present example. In addition, the regularity of the distribution of silicon (Si) in the nano silicon material of the present example is lower than that in Comparative Example 1.

Figure 16:
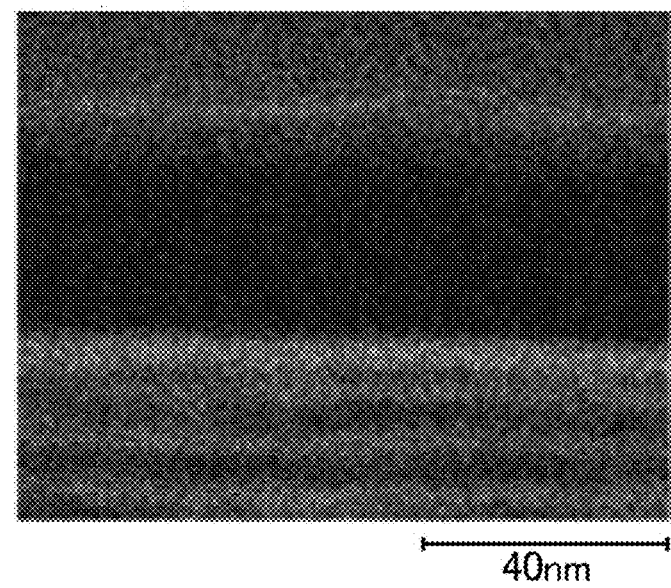
FIG. 16 is a TEM-EDX image showing a distribution of oxygen (O) of the nano silicon material according to Comparative Example 2.
Figure 17:
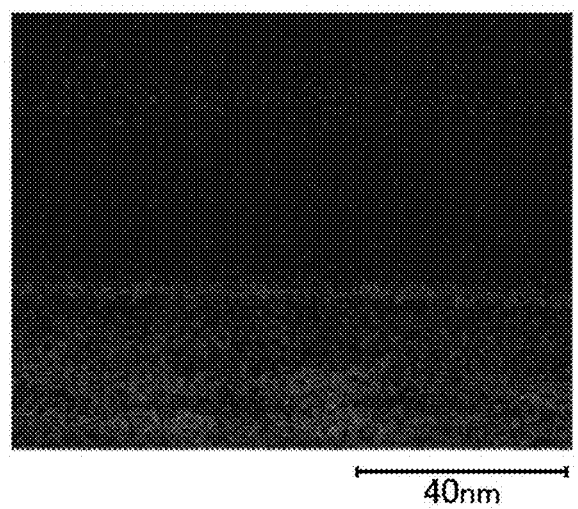
FIG. 17 is a TEM-EDX image showing a distribution chlorine (Cl) of the nano silicon material according to Comparative Example 2.

Whereas oxygen (O) and chlorine (Cl) are clearly distributed as layers between silicon (Si) layers in the nano silicon material according to Comparative Example 2 as shown in FIGS. 16 and 17, the nano silicon material of the present example has a different layer structure of oxygen (O) as shown in FIG. 7. Specifically, as shown in FIG. 7, the layer structure of oxygen (O) and chlorine (Cl) confirmed in Comparative Example 2 as shown in FIGS. 16 and 17 was not confirmed in the present example, and accordingly, Si layers are partially in contact with or close to each other, so that an electrically-conductive path and an ion conducting path between silicon are formed.

In the nano silicon material of the present example, fluorine (F) is substantially uniformly distributed in the entirety thereof as shown in FIG. 8. In FIG. 8, a curved line shows a boundary with the support material, and an arrow indicates that a portion below the curved line is the distribution of fluorine (F). The atom ratio of each element in this nano silicon material is shown in Table 1.

Example 2

A mixed solution of 2 mL of an HF aqueous solution having a concentration of 46 mass % and 63 mL of an HCl aqueous solution having a concentration of 36 mass % was set to a temperature of 0° C. in an ice bath, and 3.3 g of calcium disilicide ($CaSi_2$) was added thereto and the mixed solution was stirred in an argon gas current. After completion of foaming was confirmed, the mixed solution was warmed to room temperature and further stirred for 2 hours at room temperature, then 20 ml of distilled water was added thereto, and the mixed solution was further stirred for 10 minutes. At this moment, suspension of a yellow powder was observed.

The obtained mixed solution was filtered, and the residue was rinsed with 10 ml of distilled water, then rinsed with 10 ml of ethanol, and vacuum dried to obtain 2.5 g of a layered silicon compound. A Raman spectrum of the layered silicon compound is similar to that in FIG. 1, and peaks were present at approximately 330±10 $cm^{-1}$, approximately 360±10 $cm^{-1}$, approximately 498±10 $cm^{-1}$, approximately 638±10 $cm^{-1}$, and approximately 734±10 $cm^{-1}$ of Raman shift.

Then, 2 g of the layered silicon compound was weighed out, and a heat treatment of keeping the layered silicon compound at 500° C. was performed for 1 hour in argon gas in which the amount of $O_2$ was not greater than 1 vol %, to obtain 1.22 g of a brown nano silicon material.

Figure 9:
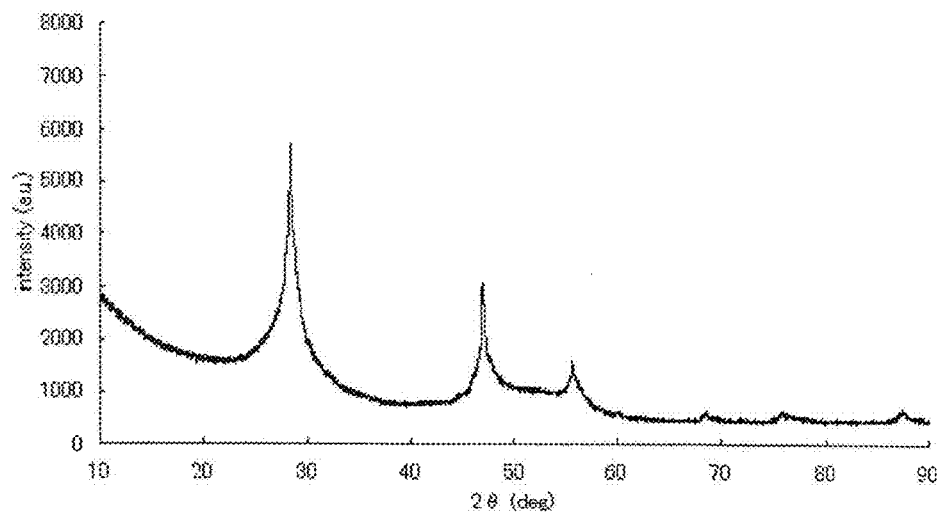
FIG. 9 is an XRD chart of a nano silicon material according to Example 2.

Measurement of X-ray diffraction (XRD measurement) using CuKα radiation was conducted on this nano silicon material. An XRD chart is shown in FIG. 9. From FIG. 9, presence of three peaks derived from the silicon crystallites is confirmed. The crystallite size of the silicon crystallites calculated in accordance with Scherrer's equation from the half width of a diffraction peak (present at a position at which 2θ is 27° to 30°) of the (111) plane in the X-ray diffraction measurement result was 3.3 nm. The BET specific surface area of the nano silicon material was 53.1 $m^2/g$.

A Raman spectrum of the obtained nano silicon material has a peak at a lower wave number side (approximately 477 $cm^{-1}$) than 520 $cm^{-1}$ of crystalline silicon, and the half width of this peak is 96 $cm^{-1}$.

Figure 10:
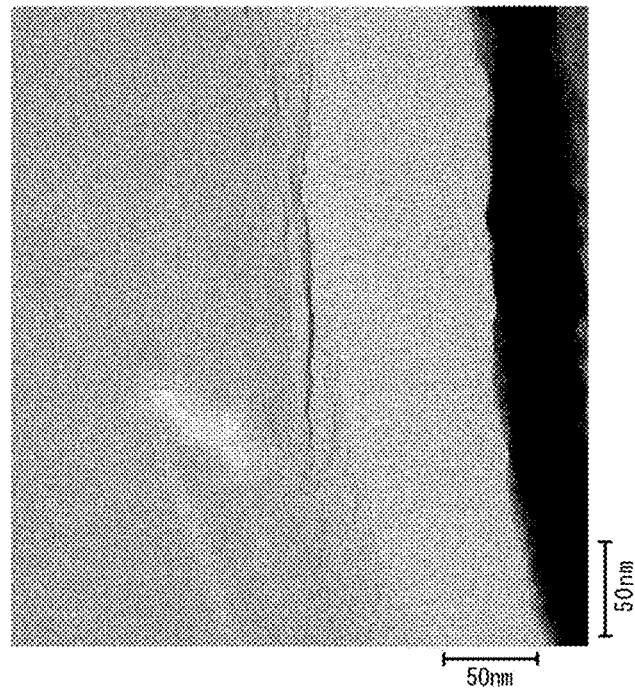
FIG. 10 shows a TEM image of the nano silicon material according to Example 2.

When the obtained nano silicon material was observed with an SEM, a structure in which plate-like bodies are laminated was observed similarly as in Example 1. In addition, the obtained nano silicon material was observed with a TEM, and an image thereof is shown in FIG. 10. In FIG. 10, a stripe-like pattern is not clear, so that the crystallinity of the nano silicon material is suggested to be lower than that in Example 1.

Figure 11:
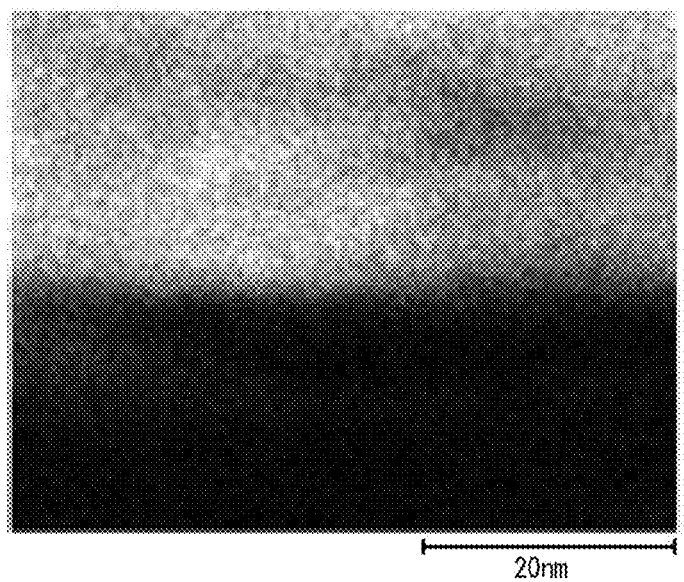
FIG. 11 is a TEM-EDX image showing a distribution of silicon (Si) of the nano silicon material according to Example 2.
Figure 12:
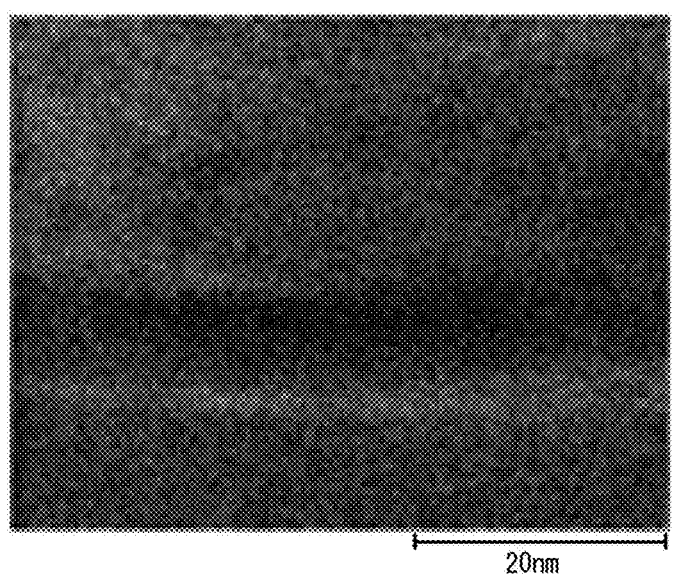
FIG. 12 is a TEM-EDX image showing a distribution of oxygen (O) of the nano silicon material according to Example 2.
Figure 13:
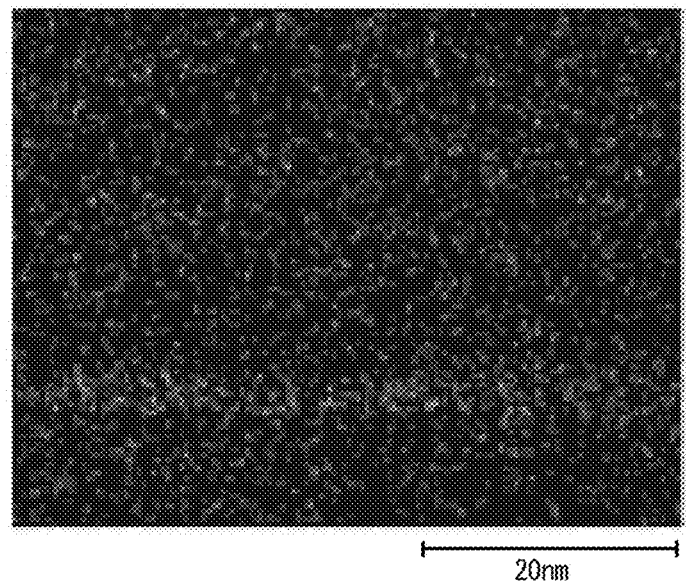
FIG. 13 is a TEM-EDX image showing a distribution of fluorine (F) of the nano silicon material according to Example 2.
Figure 14:
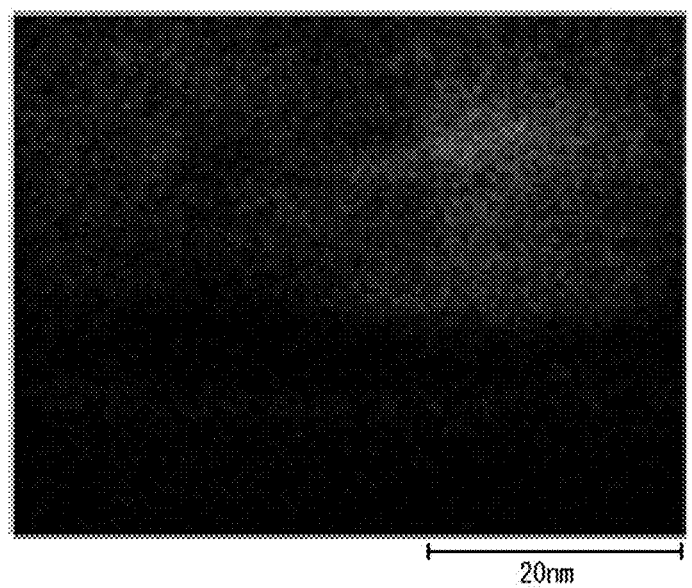
FIG. 14 is a TEM-EDX image showing a distribution of chlorine (Cl) of the nano silicon material according to Example 2.

The nano silicon material was further analyzed by TEM-EDX (energy dispersive X-ray spectroscopy). A distribution of silicon (Si) is shown in FIG. 11, a distribution of oxygen (O) is shown in FIG. 12, a distribution of fluorine (F) is shown in FIG. 13, and a distribution of chlorine (Cl) is shown in FIG. 14. A substantially lower half in each drawing is a support material. Each of oxygen (O) and fluorine (F) in FIGS. 12 and 13 is observed to be present also in the lower half, since a part thereof adheres to the support material. In FIG. 11, presence of a hollow portion, which was observed to be present in Example 1, was not able to be confirmed. From FIGS. 12 and 14, oxygen (O) and chlorine (Cl) are distributed randomly, and a layer structure as in Comparative Example 2 described later was not observed. From FIG. 13, fluorine (F) was substantially uniformly distributed in the entirety. The atom ratio of each element in this nano silicon material is shown in Table 1.

Example 3

A nano silicon material was obtained, using the layered silicon compound obtained in Example 1, similarly to Example 1 except that the heat treatment temperature was 900° C. The crystallite size of this nano silicon material calculated in accordance with Scherrer's equation from the half width of a diffraction peak (present at a position at which 2θ is 27° to 30°) of the (111) plane in an X-ray diffraction measurement result was 9.1 nm. The BET specific surface area of the nano silicon material was 7.7 $m^2/g$. The atom ratio of each element in the nano silicon material measured by TEM-EDX is shown in Table 1.

Example 4

A nano silicon material was obtained, using the layered silicon compound obtained in Example 2, similarly to Example 2 except that the heat treatment temperature was 900° C. The crystallite size of this nano silicon material calculated in accordance with Scherrer's equation from the half width of a diffraction peak of the (111) plane in an X-ray diffraction measurement result was 6.7 nm. The BET specific surface area of the nano silicon material was 11.2 $m^2/g$. The atom ratio of each element in the nano silicon material measured by TEM-EDX is shown in Table 1.

Comparative Example 1

Sixty-five milliliters of an HCl aqueous solution having a concentration of 36 mass % was set to a temperature of 0° C. in an ice bath, and 3.3 g of calcium disilicide ($CaSi_2$) was added thereto and the mixed solution was stirred in an argon gas current. After completion of foaming was confirmed, the mixed solution was warmed to room temperature and further stirred for 2 hours at room temperature, then 20 ml of distilled water was added thereto, and the mixed solution was further stirred for 10 minutes. At this moment, suspension of a yellow powder was observed. The obtained mixed solution was filtered, and the residue was rinsed with 10 ml of distilled water, then rinsed with 10 ml of ethanol, and vacuum dried to obtain 3.5 g of a layered silicon compound.

Then, 3.5 g of the layered silicon compound was weighed out, and a heat treatment of keeping the layered silicon compound at 500° C. was performed for 1 hour in argon gas in which the amount of $O_2$ was not greater than 1 vol %, to obtain 2.9 g of a brown nano silicon material. The BET specific surface area of this nano silicon material was 7.6 $m^2/g$. The atom ratio of each element in the nano silicon material measured by TEM-EDX is shown in Table 1.

Comparative Example 2

On 3.5 g of a layered silicon compound produced similarly to Comparative Example 1, a heat treatment of keeping the layered silicon compound at 800° C. was performed for 1 hour in argon gas in which the amount of $O_2$ was not greater than 1 vol %, to obtain 2.6 g of a brown nano silicon material. The BET specific surface area of this nano silicon material was 5.5 $m^2/g$.

Figure 15:
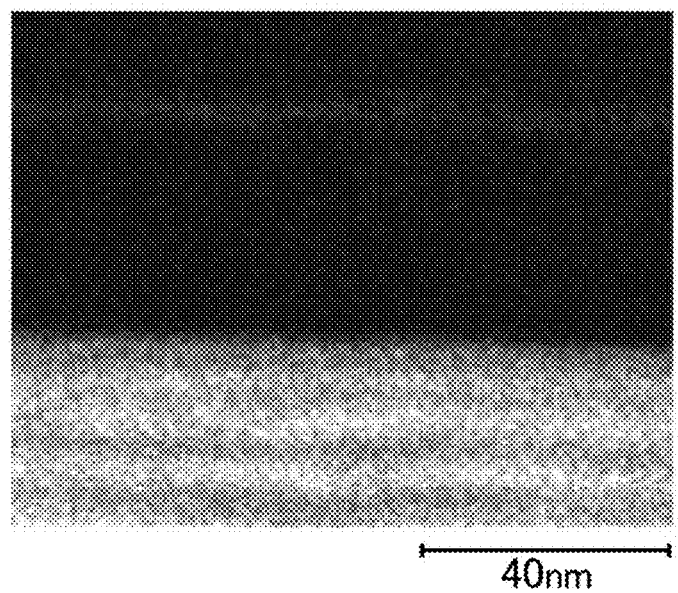
FIG. 15 is a TEM-EDX image showing a distribution of silicon (Si) of a nano silicon material according to Comparative Example 2.

The nano silicon material was further analyzed by TEM-EDX (energy dispersive X-ray spectroscopy). A distribution of silicon (Si) is shown in FIG. 15, a distribution of oxygen (O) is shown in FIG. 16, and a distribution of chlorine (Cl) is shown in FIG. 17. A substantially upper half in each drawing is a support material. Each of oxygen (O) and chlorine (Cl) is observed to be present also in the upper half in FIG. 16 or 17, since a part thereof adheres to the support material. From FIG. 15, presence of a hollow portion, which was observed to be present in Example 1, was not able to be confirmed. From FIGS. 15 to 17, all of silicon (Si), oxygen (O), and chlorine (Cl) are distributed as layers, and a layer in which oxygen (O) and chlorine (Cl) are present is thought to be interposed between silicon (Si) layers. The atom ratio of each element in the nano silicon material is shown in Table 1.

<XRD Measurement in Comparative Examples>

Figure 18:
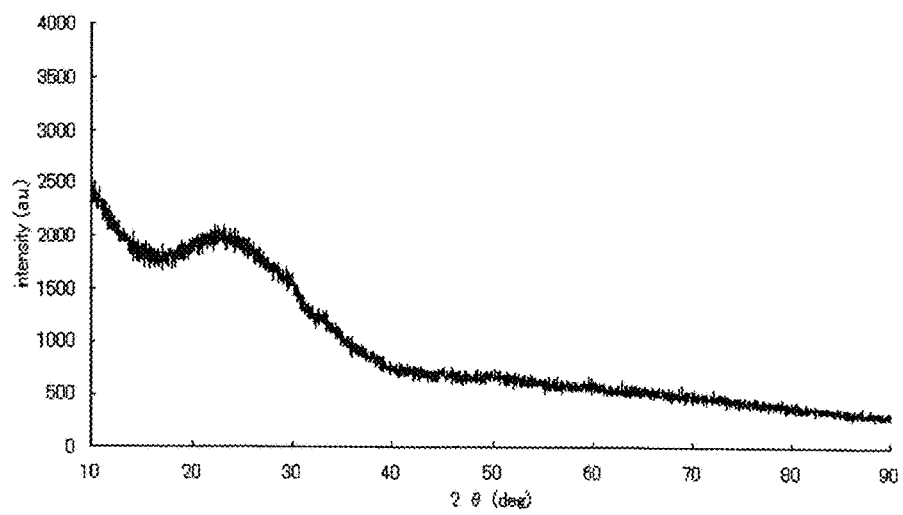
FIG. 18 is an XRD chart of a nano silicon material according to Comparative Example 1.
Figure 19:
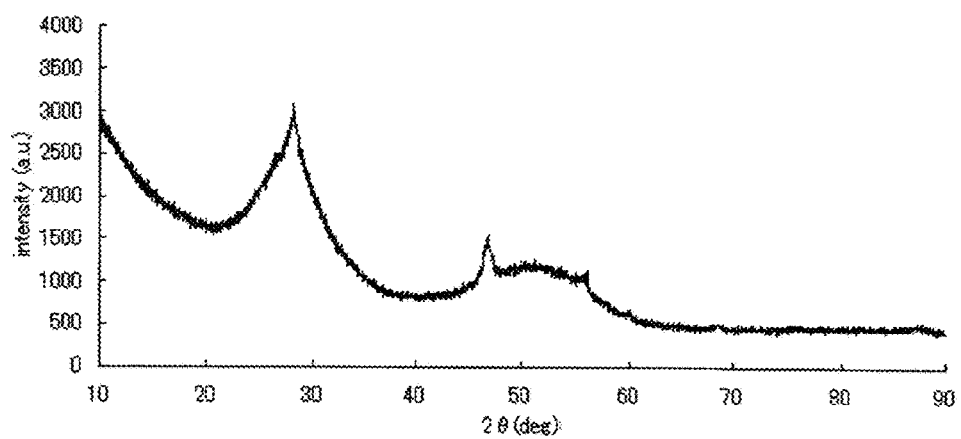
FIG. 19 is an XRD chart of the nano silicon material according to Comparative Example 2.

Measurement of X-ray diffraction (XRD measurement) using CuKα radiation was conducted on the nano silicon materials of Comparative Examples 1 and 2. The results are shown in FIGS. 18 and 19, respectively. From FIG. 19, three peaks derived from silicon crystallites are observed in Comparative Example 2, but are very broad as compared to Examples, and generation of a large amount of amorphous silicon is recognized. In addition, from FIG. 18, no clear peak is observed in Comparative Example 1, so that it is thought that amorphous silicon is a major part and silicon crystallites are almost not generated.

A Raman spectrum of each of the obtained nano silicon materials has a peak at a lower wave number side (Comparative Example 1: approximately 472 $cm^{-1}$, Comparative Example 2: approximately 495 $cm^{-1}$) than 520 $cm^{-1}$ of crystalline silicon, and the half width of the peak is 114 $cm^{-1}$ in Comparative Example 1 and 101 $cm^{-1}$ in Comparative Example 2.

<Production of Battery>

A slurry was prepared by mixing 45 parts by mass of each of the nano silicon materials of the respective Examples and the respective Comparative Examples, 40 parts by mass of a natural graphite powder, 5 parts by mass of acetylene black, and 33 parts by mass of a binder solution. As the binder solution, a solution in which a polyamide-imide (PAI) resin was dissolved in N-methyl-2-pyrrolidone (NMP) in 30 mass % was used. Each of these slurries was applied on the surface of an electrolytic copper foil (current collector) having a thickness of approximately 20 µm by using a doctor blade, and dried to form a negative electrode active material layer on the copper foil. Then, the current collector and the negative electrode active material layer were firmly adhered and joined by using a roll press machine. Each obtained joined object was vacuum dried at 100° C. for 2 hours to form a negative electrode in which the thickness of the negative electrode active material layer was 16 µm.

A lithium secondary battery (half cell) was produced by using, as an evaluation electrode, each negative electrode produced by the above-described procedure. A metal lithium foil (thickness: 500 µm) was used as a counter electrode.

The counter electrode and the evaluation electrode were respectively cut to have diameters of 13 mm and 11 mm, and a separator (a glass filter manufactured by the Hoechst Celanese Corp., and "Celgard 2400" manufactured by Celgard LLC.) was interposed between both electrodes to form an electrode assembly battery. The electrode assembly battery was housed in a battery case (a member for CR2032 type coin batteries, manufactured by Hohsen Corp.). A nonaqueous electrolytic solution obtained by dissolving $LiPF_6$ at a concentration of 1 M in a mixed solvent in which ethylene carbonate and diethyl carbonate were mixed at 1:1 (volume ratio) was poured in the battery case, and then the battery case was sealed to obtain a lithium secondary battery.

<Battery Characteristic Test>

Parts of the production methods for and characteristic values of the nano silicon materials of the respective Examples and the respective Comparative Examples are shown in Table 1.

TABLE 1

| | Acid type | Heat treatment temperature (° C.) | Atom ratio (values in parentheses are values when Si is regarded as 1) | | | |
|---|---|---|---|---|---|---|
| | | | Si | O | F | Cl |
| Example 1 | $HBF_4$ | 500 | 2.62 | 0.53 (0.20) | 0.22 (0.08) | — |
| Example 2 | HF + HCl | 500 | 2.71 | 0.41 (0.15) | 0.23 (0.08) | 0.21 (0.08) |
| Example 3 | $HBF_4$ | 900 | 2.66 | 0.56 (0.21) | 0.30 (0.11) | — |
| Example 4 | HF + HCl | 900 | 2.96 | 0.40 (0.14) | 0.01 (0.003) | 0.1 (0.03) |
| Comparative Example 1 | HCl | 500 | 2.42 | 0.86 (0.36) | — | 0.28 (0.12) |
| Comparative Example 2 | HCl | 800 | 2.45 | 0.83 (0.34) | — | 0.25 (0.10) |

For the lithium secondary batteries of the respective Examples and the respective Comparative Examples, an initial charge capacity obtained when charging was conducted under the conditions of a temperature of 25° C. and a current of 0.2 mA was measured, and the results are shown in Table 2. In addition, a discharge capacity obtained when discharging was conducted under the condition of a current of 0.2 mA was measured, initial efficiency (100×discharge capacity/charge capacity) was calculated, and the results are shown in Table 2.

TABLE 2

| | Si crystallites | | BET specific surface area ($m^2/g$) | Initial efficiency (%) | Initial charge capacity (mAh/g) |
|---|---|---|---|---|---|
| | Presence/absence | Size | | | |
| Example 1 | Presence | 7.8 nm | 13.2 | 75.2 | 1233 |
| Example 2 | Presence | 3.3 nm | 53.1 | 76.3 | 1304 |
| Example 3 | Presence | 9.1 nm | 7.7 | 82 | 1428 |
| Example 4 | Presence | 6.7 nm | 11.2 | 79 | 1448 |
| Comparative Example 1 | Absence | — | 7.6 | 68.1 | 985 |
| Comparative Example 2 | Presence | 1.7 nm | 5.5 | 71.1 | 933 |

The silicon material of Comparative Example 1 is thought to have lower battery characteristics than those in each Example, since silicon crystallites are not present in the silicon material of Comparative Example 1.

In the nano silicon material of Comparative Example 2, a layer in which oxygen (O) and chlorine (Cl) are present is interposed between silicon (Si) layers. Therefore, when lithium ions react from the surface of the nano silicon material, the lithium ions always reach the next silicon (Si) layer via the layer in which oxygen (O) and chlorine (Cl) are present. The layer in which oxygen (O) and chlorine (Cl) are present is expected to react with the lithium ions, and the moving speed of the lithium ions decreases. In particular, chlorine (Cl) firmly binds to the lithium ions to form a salt, and thus the conductive resistance is thought to increase. Thus, Comparative Example 2 is thought to have lower battery characteristics than those in each Example.

On the other hand, in the nano silicon material of each Example, the concentrations of oxygen (O) and chlorine (Cl) are low due to the presence of fluorine (F), so that reaction thereof with lithium ions is suppressed. Due to lowered conductive resistance, a decrease in the moving speed of lithium ions is suppressed, so that high battery characteristics are thought to be exhibited.

Furthermore, with the production method of the present invention, even when the heat treatment temperature is as low as 500° C., silicon crystallites are generated. Therefore, a decrease in the BET specific surface area is suppressed as compared to the case where a heat treatment is performed at a high temperature. By using $HBF_4$ as the acid, the degree of a decrease in the BET specific surface area is found to be low even when the heat treatment temperature is as high as 900° C. Therefore, the lithium ion battery of each Example has improved initial efficiency and initial capacity as compared to the Comparative Examples.

INDUSTRIAL APPLICABILITY

The nano silicon material of the present invention can be utilized as the negative electrode active material of an electrical storage device such as secondary batteries, electric double layer capacitors, lithium ion capacitors, and the like. Since the specific surface area is large and the contained oxygen amount is small, a secondary battery in which the nano silicon material of the present invention is used as a negative electrode active material is useful as a secondary battery utilized for driving motors of electric vehicles and hybrid automobiles and for personal computers, portable communication devices, home appliance, office instrument, industrial instrument, and the like, and can be suitably used particularly for driving motors of electric vehicles and hybrid automobiles requiring large capacity and large output.

Furthermore, the degree of freedom of the heat treatment temperature is high, and the nano silicon material of the present invention can be composited with another material by controlling the magnitude of the specific surface area thereof. Thus, the nano silicon material of the present invention can be utilized as a semiconductor material such as for CMOS and semiconductor memory, a solar battery material, and a photocatalyst material, etc.

The invention claimed is:

1. A nano silicon material containing fluorine and nano-sized silicon crystallites, wherein
    an elemental composition of the nano silicon material has an atomic ratio relationship of $SiO_xCl_yF_z$ where $0<(x+y+z)\leq1$, $0<x<0.5$, $0\leq y$ and $0<z$,
    the silicon crystallites have a crystallite size of 0.5 nm to 300 nm, the crystallite size being calculated in accordance with Scherrer's equation from a half width of a diffraction peak of a (111) plane in an X-ray diffraction measurement result, and
    the fluorine is contained in 0.01 to 10 mass %.

2. The nano silicon material according to claim 1, wherein the nano silicon material has a peak at a lower wave number side than 520 $cm^{-1}$ of Raman shift in a Raman spectrum, and a half width of the peak is within a range of 30 to 100 $cm^{-1}$.

3. The nano silicon material according to claim 1, wherein the nano silicon material is composed of a plurality of plate-like bodies laminated in a thickness direction thereof, and each of the plate-like bodies has a thickness of 1 nm to 200 nm.

4. The nano silicon material according to claim 3, wherein the nano silicon material has a connection portion at which the plate-like bodies are chemically or physically connected to each other, and has a hollow portion surrounded by the plate-like bodies and the connection portion.

5. The nano silicon material according to claim 1, wherein the fluorine is dispersedly present in an entirety of the nano silicon material.

6. The nano silicon material according to claim 1, wherein the nano silicon material has a BET specific surface area of not less than 3 $m^2/g$.

7. The nano silicon material according to claim 1, wherein a contained oxygen (O) amount in the nano silicon material is not greater than 20 mass %.

8. A negative electrode active material containing the nano silicon material according to claim 1.

9. A negative electrode containing the negative electrode active material according to claim 8.

10. A secondary battery comprising the negative electrode according to claim 9.

* * * * *